(12) United States Patent
Allicock

(10) Patent No.: US 11,326,686 B2
(45) Date of Patent: May 10, 2022

(54) UTILITY VEHICLE HAVING CONTINUOUSLY VARIABLE TRANSMISSION

(71) Applicant: KUBOTA CORPORATION, Osaka (JP)

(72) Inventor: Nicholas Allicock, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 114 days.

(21) Appl. No.: 16/734,955

(22) Filed: Jan. 6, 2020

(65) Prior Publication Data

US 2021/0207704 A1 Jul. 8, 2021

(51) Int. Cl.
*F16H 57/04* (2010.01)
*B60K 17/06* (2006.01)
*F16H 57/027* (2012.01)
*F16H 57/02* (2012.01)

(52) U.S. Cl.
CPC ......... *F16H 57/0416* (2013.01); *B60K 17/06* (2013.01); *F16H 57/027* (2013.01); *F16H 57/0489* (2013.01); *B60Y 2400/72* (2013.01); *F16H 2057/02056* (2013.01)

(58) Field of Classification Search
CPC ............. F16H 57/0416; F16H 57/0489; F16H 2057/02056; F16H 57/027; B60K 11/06; B60K 11/08; B60K 17/06; F28D 2021/008; B60Y 2200/124; B60Y 2200/20; B60Y 2400/72
See application file for complete search history.

(56) References Cited

U.S. PATENT DOCUMENTS

| 6,823,956 | B2* | 11/2004 | Shimizu | F16H 57/0415 180/68.1 |
| 6,938,676 | B2* | 9/2005 | Lan | B62K 5/01 165/41 |
| 8,613,335 | B2* | 12/2013 | Deckard | B23P 6/00 180/68.3 |
| 8,997,908 | B2* | 4/2015 | Kinsman | B60R 21/13 180/89.1 |
| 9,217,501 | B2 | 12/2015 | Deckard et al. | |
| 9,725,023 | B2 | 8/2017 | Miller et al. | |
| 10,124,659 | B2* | 11/2018 | Bessho | B60K 17/08 |

(Continued)

FOREIGN PATENT DOCUMENTS

| CA | 2807140 A1 * | 2/2012 | ............... B60G 3/14 |
| JP | 08219262 A * | 8/1996 | ......... F16H 57/0402 |

*Primary Examiner* — Adam D Rogers
(74) *Attorney, Agent, or Firm* — Greenblum & Bernstein, P.L.C.

(57) ABSTRACT

A utility vehicle has a CVT, an engine providing power to the CVT, a CVT case accommodating the CVT, front and rear wheels supporting the vehicle body frame on the ground surface and an exterior side panel supported to the vehicle body frame. The exterior side panel includes an inner wall located inside a vehicle cabin and an outer wall located outside the vehicle cabin. An intake chamber is formed between the inner wall and the outer wall of the exterior side panel. An intake opening portion is provided in the exterior side panel for introducing ambient air present around the exterior side panel to the intake chamber. The intake chamber and the CVT case are connected and communicated to each other via an intake hose.

6 Claims, 6 Drawing Sheets

(56) References Cited

U.S. PATENT DOCUMENTS

| | | | |
|---|---|---|---|
| 10,473,208 B2* | 11/2019 | Wang | F16H 57/0416 |
| 10,648,554 B2* | 5/2020 | Kuhl | F16H 57/0416 |
| 10,655,574 B2* | 5/2020 | Hamada | F02M 35/10288 |
| 10,663,053 B2* | 5/2020 | Quinn | F16H 57/0489 |
| 10,947,936 B2* | 3/2021 | Tanaka | F02M 35/161 |
| 2006/0270503 A1* | 11/2006 | Suzuki | F16H 57/0489 |
| | | | 474/144 |
| 2019/0263253 A1* | 8/2019 | Doveri | B60K 11/04 |
| 2019/0285160 A1* | 9/2019 | Nelson | F16H 57/0416 |
| 2019/0383248 A1* | 12/2019 | Bouchard | B60K 13/02 |
| 2020/0208731 A1* | 7/2020 | Matsudo | F02M 35/0204 |

\* cited by examiner

UTILITY VEHICLE HAVING CONTINUOUSLY VARIABLE TRANSMISSION

TECHNICAL FIELD

This invention relates to a utility vehicle having a CVT, more particularly to a cooling system for its CVT.

BACKGROUND ART

U.S. Pat. No. 9,217,501 discloses a cooling system for a continuously variable transmission (to be referred to as "CVT" in short, hereinafter). In this cooling system, an intake system and an exhaust system are connected to a CVT case accommodating a CVT. The intake system consists of an air inlet portion, a conduit and a duct. The duct is connected to the CVT case. The conduit connects the duct to the air inlet portion. The air inlet portion has an air inlet. An opening is formed in a vehicle body panel constituting a side wall of a cargo bed of the utility vehicle, and a filter is attached to this opening. The air inlet portion is incorporated within the vehicle body panel so as to allow introduction of air passing through the filter via the air inlet.

U.S. Pat. No. 9,725,023 too discloses a cooling system for a CVT mounted on a similar utility vehicle. This cooling system includes two air inlet conduits, with an air inlet portion of one conduit being connected to a nozzle-like air inlet port provided in and extending through a vehicle body panel for allowing direct introduction of ambient air. The air inlet portion of the other conduit is not exposed to the outside except for its air inlet and is disposed beneath the vehicle body panel.

SUMMARY OF INVENTION

In the case of the above-described known cooling systems, the air inlet portion of the intake system is incorporated in the vehicle body panel.

This results in increased complexity of the vehicle body panel arrangement, leading to increased manufacture cost thereof.

An object of the present invention is to provide a utility vehicle having a CVT cooling system including an (air) intake system allowing effective and efficient introduction of ambient air, without inviting complexity of the vehicle body panel.

A utility vehicle having a CVT, according to the present invention, comprises:

a vehicle body frame;

front and rear wheels supporting the vehicle body frame on the ground surface;

an engine providing power to the CVT;

a CVT case accommodating the CVT;

an exterior side panel supported to the vehicle body frame, the exterior side panel having an inner wall located inside a vehicle cabin and an outer wall located outside the vehicle cabin;

an intake chamber formed between the inner wall and the outer wall of the exterior side panel;

an intake opening portion provided in the exterior side panel for introducing ambient air present around the exterior side panel to the intake chamber; and an intake hose connecting the intake chamber with the CVT case.

In the above-described configuration, the exterior side panel which creates a space for a passenger or a rider comprises a double-layered structure consisting of an inner wall and an outer wall. Further, between these inner and outer walls, there is formed an intake chamber for the intake system for cooling the CVT. Such intake chamber can be readily made by the blow molding technique, not inviting increase in the manufacture cost of the exterior side panel. Moreover, such intake chamber can be formed with a sufficiently large capacity. As the intake chamber serving as a temporary storage chamber for ambient air is incorporated in a passage for introducing ambient air into the CVT case accommodating the CVT, feeding of the ambient air to the CVT case can proceed smoothly. Further, if a condition of the position of the intake opening portion and the connecting position of the intake hose facing the intake chamber is met, then, it becomes possible to carry out the air feeding at any portion of the lateral wall of the exterior side panel, so that designing flexibility will be increased advantageously.

The intake opening portion may be provided on either side of the lateral wall of the exterior side panel. But, if this intake opening portion is provided in the outer wall, this will make the introduction of ambient air smoother. Further, in case a filter is attached to the intake opening portion for preventing intrusion of a foreign object or substance into the CVT case, an arrangement may be made advantageously such that the surface of the filter be set substantially in flush with the wall surface of the outer wall, favorable aesthetic feature of the exterior side panel can be maintained. Moreover, in the case of providing the intake opening portion in the outer wall, an arrangement may be made advantageously such that the intake hose be connected to the intake chamber via the inner wall. With this arrangement, its connecting portion can be prevented from interfering with the intake opening portion, advantageously.

According to one preferred embodiment of the present invention, the CVT case is disposed between the engine and the intake opening portion. With this disposing arrangement, the distance (spacing) between the engine and the intake opening portion can be increased, and as the CVT case is disposed therebetween, there can be obtained an additional advantage of air present around the intake opening portion being substantially free from influence of engine heat.

DETAILED DESCRIPTION

Figure 1:
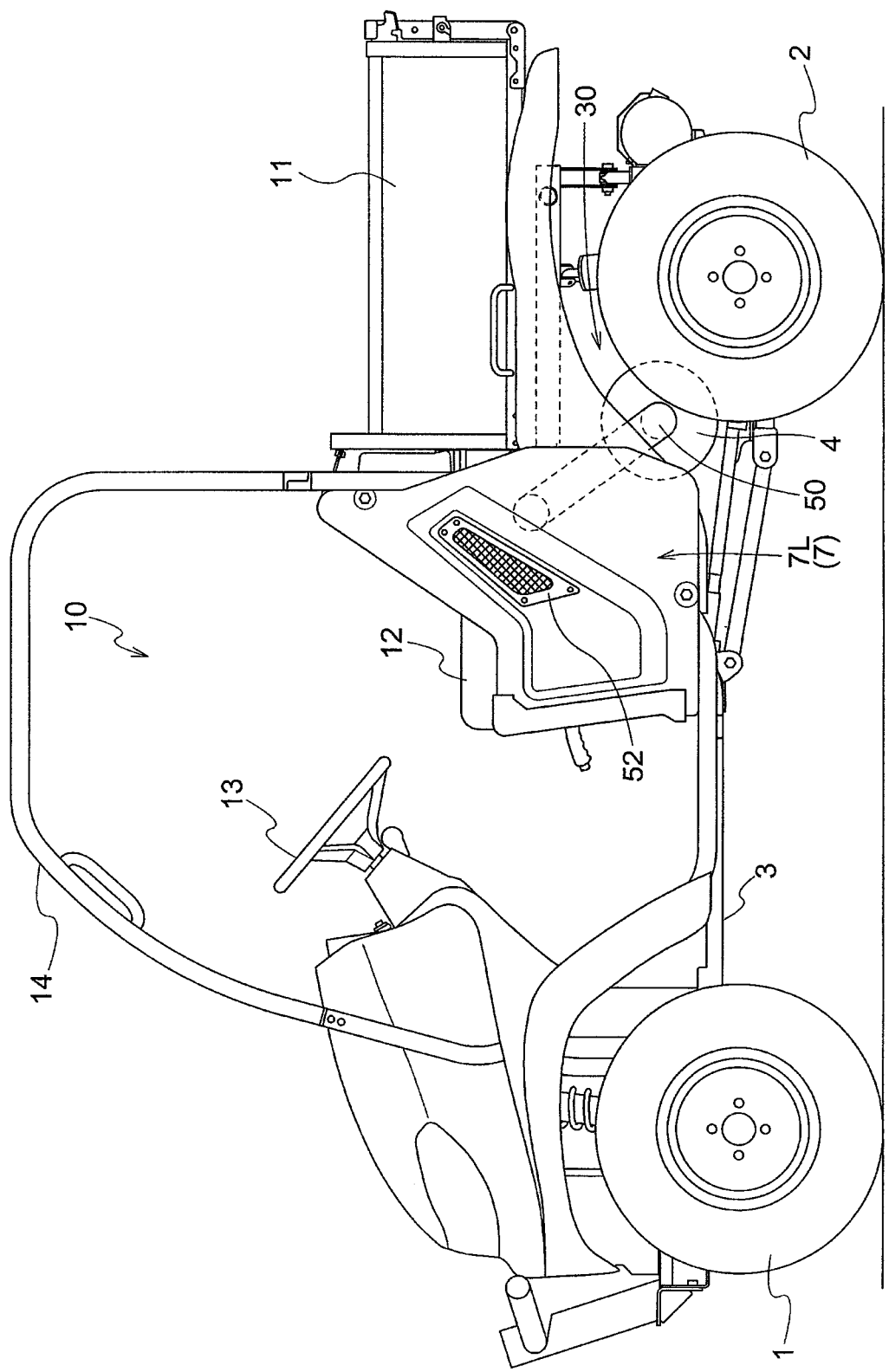
FIG. 1 is a side view of a utility vehicle.
Figure 2:
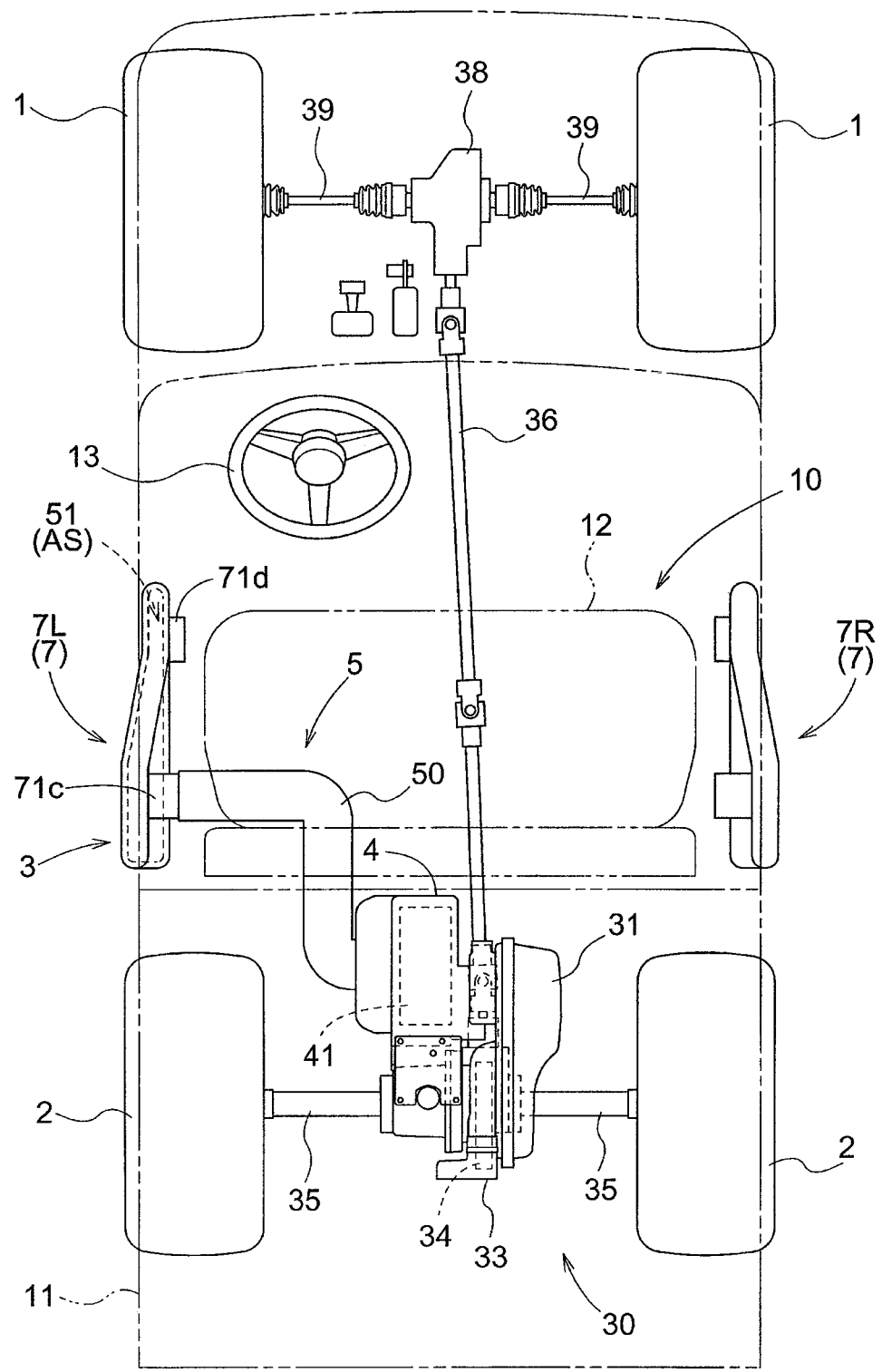
FIG. 2 is a plan view schematically showing a power transmission system and a CVT cooling system.

As shown in FIG. 1 and FIG. 2, a utility vehicle includes a vehicle body frame 3 which is supported on the ground surface via a pair of left and right front wheels 1 which can be freely operated for steering and a pair of left and right rear wheels 2. At the center portion of this vehicle body frame 3, a driving section 10 is disposed. At a rear portion of the vehicle body frame 3, a cargo bed is provided. Rearwardly of the driving section 10 and downwardly of the cargo bed 11, a power source unit 30 is disposed.

This utility vehicle is configured as a four-wheel drive type in which driving power from the power source unit 30 is transmitted to the front wheels 1 and the rear wheels 2, the utility vehicle being configured d for use in multiple-purposes of utility works, such as farming works, a transporting work, etc. A ROPS frame 14 for protecting the driving section 10 is provided to surround this driving section 10. The cargo bed 11 is configured as a dumping type that allows discharging (dumping) of a cargo or a load carried thereon by elevating the front end side of the deck. To this end, the rear end of the cargo bed 11 is pivotally supported to the vehicle body frame 3. In the driving section 10, there are provided a driver's seat 12 to be seated by a driver and a steering wheel 13 for controlling steering of the front wheels 1.

On the left side of the driver's seat 12, a left exterior side panel 7L is provided, and on the right side of the driver's seat 12, a right exterior side panel 7R is provided. The left exterior side panel 7L and the right exterior side panel 7R are in mirror-symmetry with each other and have substantially same shapes. The left exterior side panel 7L and the right exterior side panel 7R will be referred to collectively or genetically as "exterior side panel 7".

As shown in FIG. 2, the power source unit 30 includes an engine 31, a CVT case 4 and a transmission case 33. The CVT case 4 accommodates a CVT 41. The transmission case 33 accommodates a transmission 34. From the lower end portion of this transmission case 33, there are extended a pair of left and right rear wheel axles 35 for speed-changing power from the engine 31 and transmitting the resultant speed-changed power to the respective rear wheels 2. Further, also from the lower end of the transmission case 33, a transmission shaft 36 extends forwardly. Power of this transmission shaft 36 is transmitted to the front wheels 1 via a front wheel differential mechanism 38 and a pair of left and right front wheel axles 39.

The exterior side panel 7 has a double-layered structure produced by the blow molding technique. And, between the two layers thereof, there is formed a space AS capable of storing an amount of air therein. As shown in FIG. 3, FIG. 4, FIG. 5 and FIG. 6, one of the two layers forms an inner wall 71 of the exterior side panel 7 and the other of the two layers forms an outer wall 72 of the exterior side panel 7. Thus, the space AS is formed between the inner wall 71 and the outer wall 72. In the instant embodiment, the space AS of the left exterior side panel 7L is a substantially closed space. However, for allowing air communication with the outside, the inner wall 71 defines a first opening hole 71a and a second opening hole 71b and the outer wall 72 defines an opening portion 72a having a large flowing cross section.

To the CVT case 4, cooling air is fed via a cooling system 5 for cooling the CVT 41. This cooling system 5 includes an intake hose 50 which connects the space AS formed in the left exterior side panel 7L to the CVT case 4 for enabling air communication therebetween. The space AS is used as an intake chamber 51 of the cooling system 5 for temporarily storing an amount of ambient air introduced therein.

Figure 3:
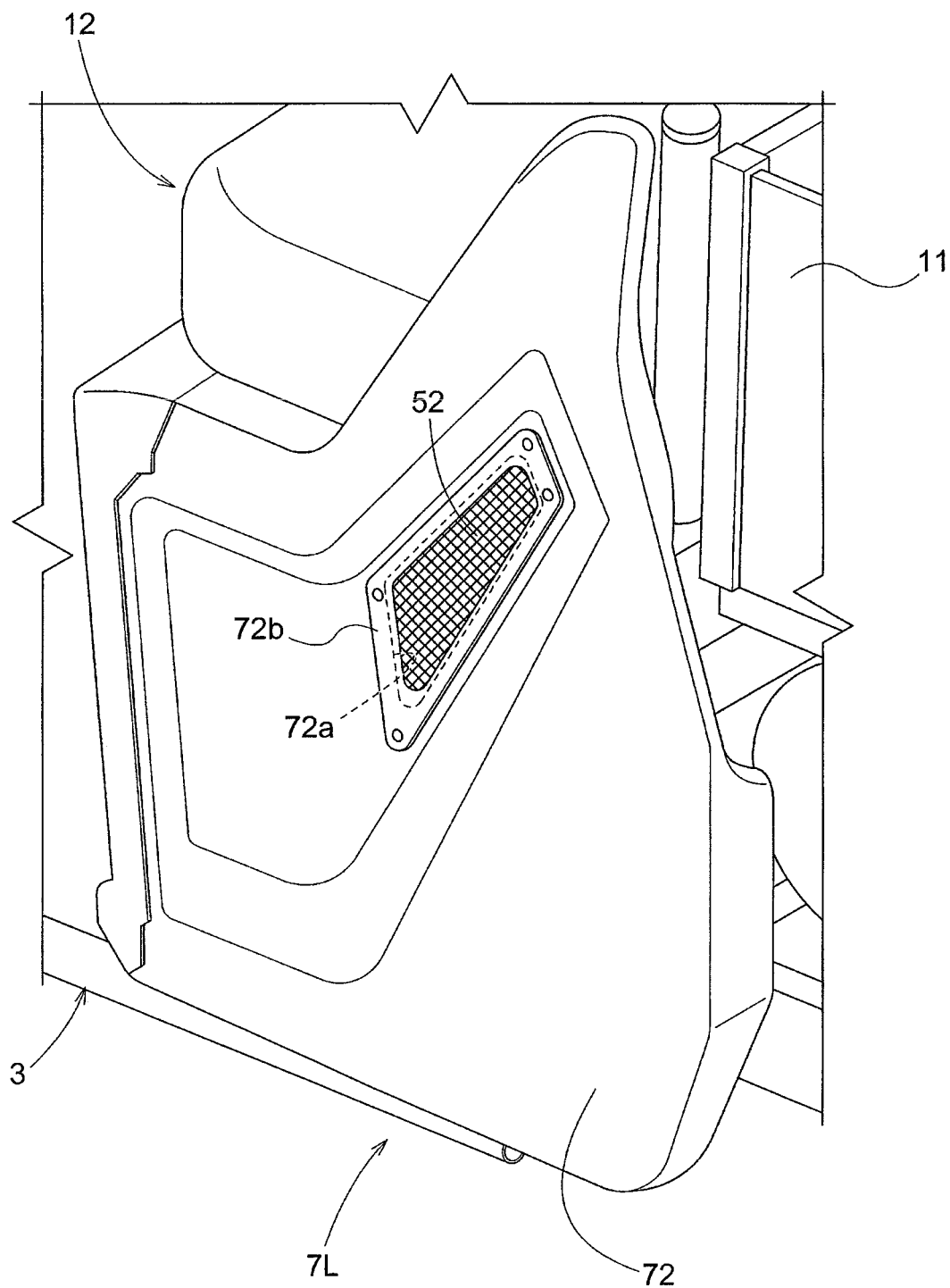
FIG. 3 is a perspective view showing an outer wall of a left exterior side panel.
Figure 4:
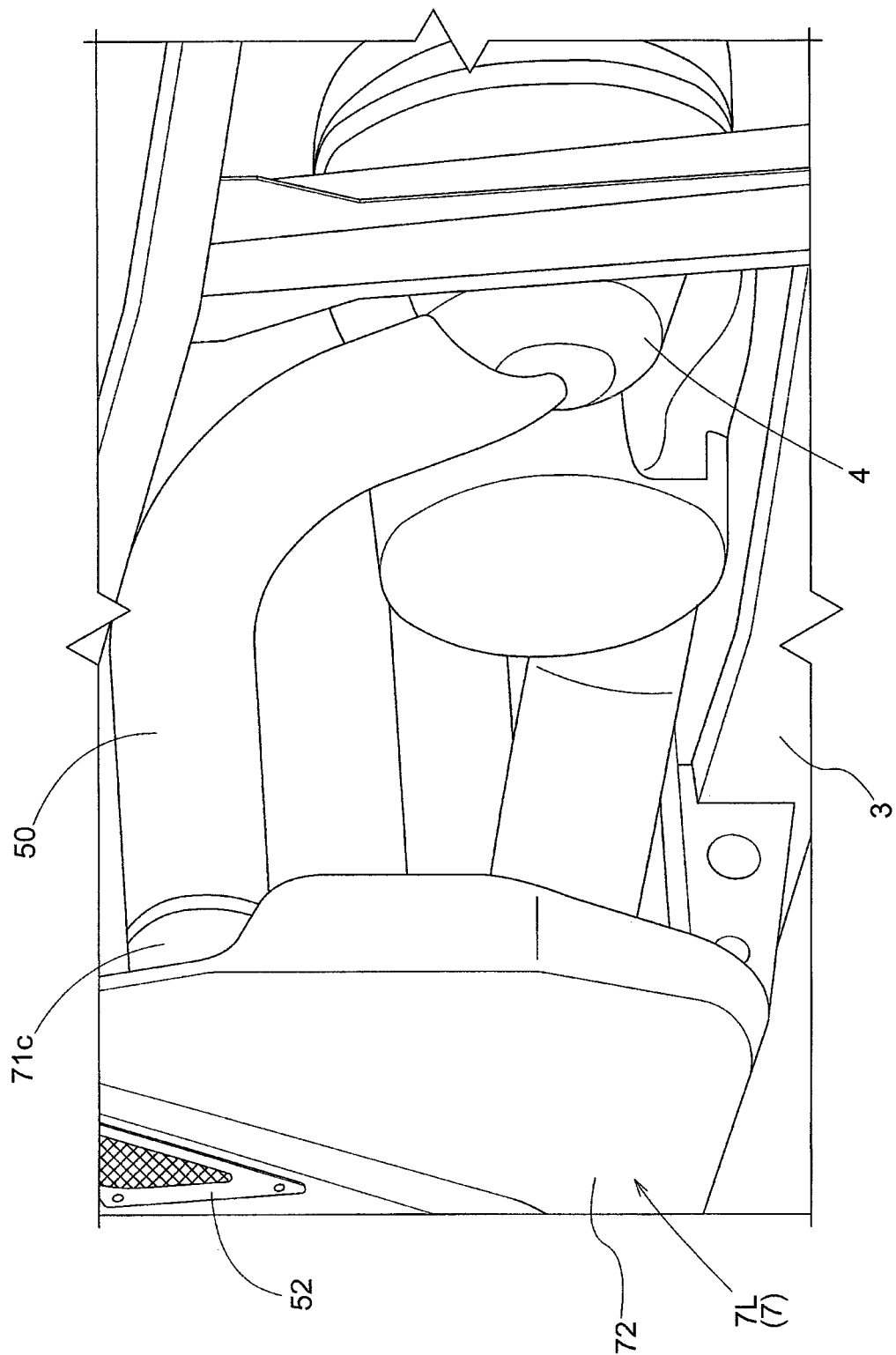
FIG. 4 is a perspective view showing an intake hose that connects an exterior side panel having an intake chamber therein to a CVT case.
Figure 6:
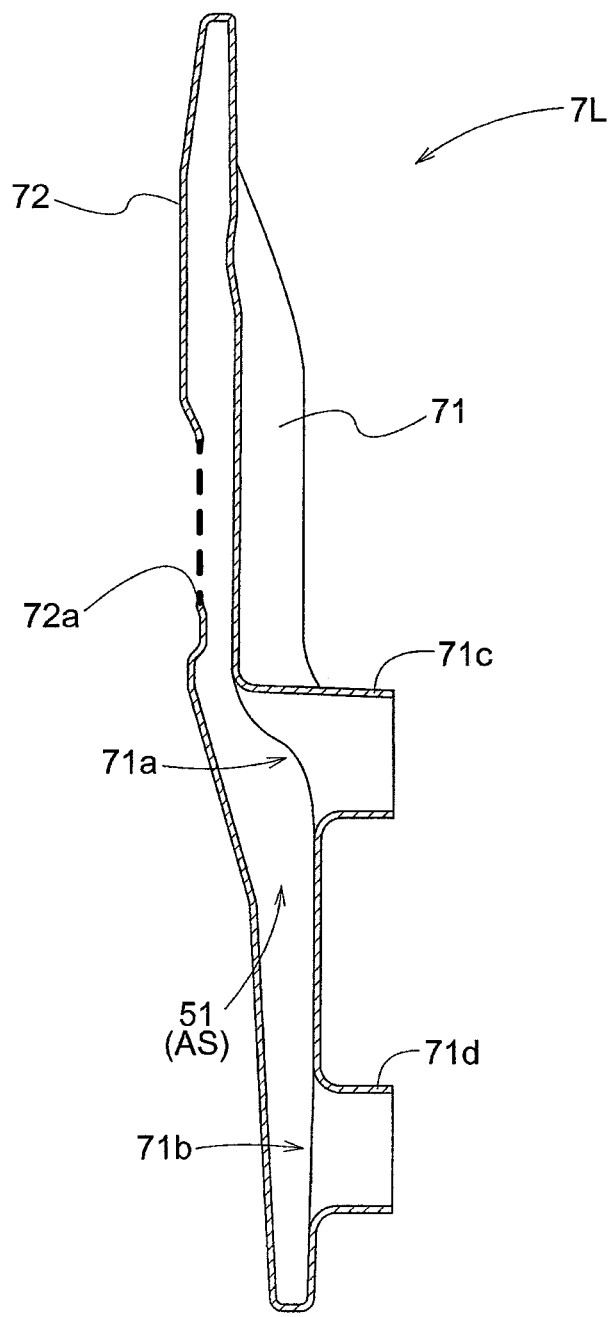
FIG. 6 is a rear view of the left exterior side panel.

As shown in FIG. 3 and FIG. 6, the opening portion 72a of the left exterior side panel 7L is used as an "intake opening portion" of the cooling system 5. The opening portion 72a is covered by a plate-like debris filter 52. To this end, the outer wall 72 has a recess 72b for fitting the debris filter 52 to the outer wall 72. More particularly, the recess 72b is designed to allow the surface of the debris filter 52 to be set in flush with the wall surface of the outer wall 72.

Figure 5:
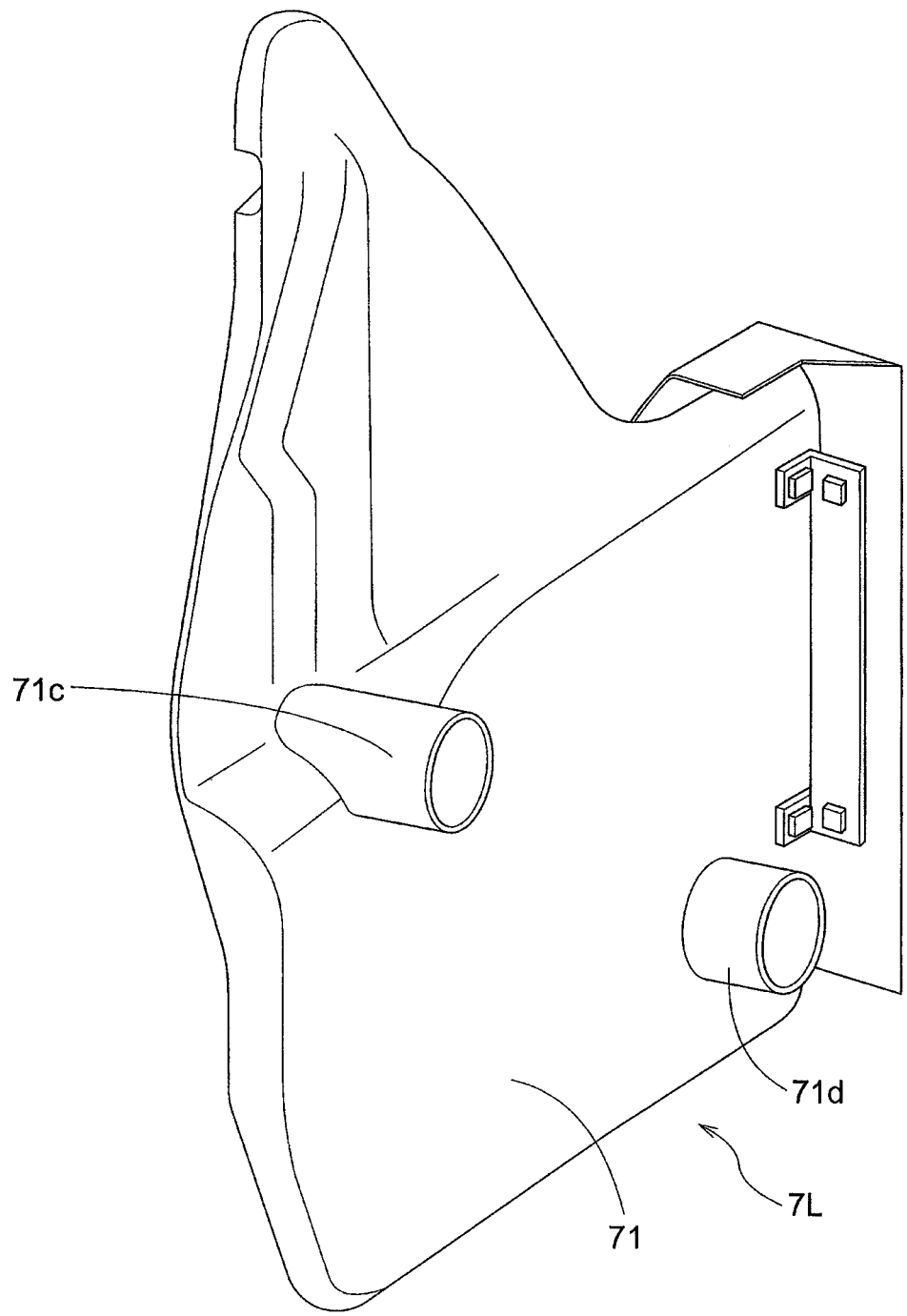
FIG. 5 is a perspective view showing an inner wall of the left exterior side panel.

The intake hose 50 communicates to the intake chamber 51 via the first opening hole 71a. To this end, as shown in FIG. 5, the first opening 71a is provided with a nozzle 71c which protrudes from the inner wall 71. The leading end of the intake hose 50 is to be attached to this nozzle 71c.

The second opening hole 71b too is provided with a nozzle 71d of its own. To this nozzle 71d, an intake hose of a further cooling system for cooling other engine accessory devices is to be attached. Namely, the intake chamber 51 is used as a shared chamber for feeding cooling air for two devices (systems).

In the foregoing embodiment, the CVT case 4 is disposed on the left side of the engine 31. Thus, the opening portion 72a, the intake chamber 51, and the opening hole 71a are all provided in the left exterior side panel 7L. On the other hand, in case the CVT case 4 is disposed on the right side of the engine 31, the opening portion 72a, the intake chamber 51, and the opening hole 71a will then be provided in the right exterior side panel 7R. Further alternatively, for a plurality of cooling systems, the opening portion 72a, the intake chamber 51, and the opening hole 71a may be provided in both the left exterior side panel 7L and the right exterior side panel 7R.

Incidentally, it is understood that the arrangements disclosed in the foregoing embodiment (including the further embodiments, applicable also to the following description) may be used in combination with any one or more of those disclosed in the other embodiment(s) as long as no contradiction results from such combining. It is also understood that the embodiments disclosed in this detailed disclosure are merely exemplary and embodiments of the present invention are not limited thereto, but various modifications thereof can be made appropriately within a range not deviating from the essential object of the present invention.

The invention claimed is:

1. A utility vehicle having a CVT, comprising:
a vehicle body frame;
front and rear wheels supporting the vehicle body frame on the ground surface;
an engine providing power to the CVT;
a CVT case accommodating the CVT;
an exterior side panel supported to the vehicle body frame, the exterior side panel having an inner wall located inside a vehicle cabin and an outer wall located outside the vehicle cabin;
an intake chamber formed between the inner wall and the outer wall of the exterior side panel;
an intake opening portion provided in the exterior side panel for introducing ambient air present around the exterior side panel to the intake chamber; and
an intake hose connecting the intake chamber with the CVT case,
wherein the intake opening portion is provided in the outer wall.

2. The utility vehicle of claim 1, wherein a filter is attached to the intake opening portion and a surface of the filter is substantially in flush with a wall surface of the outer wall.

3. The utility vehicle of claim 1, wherein the intake hose is communicated to the intake chamber via a nozzle provided in the inner wall.

4. The utility vehicle of claim 1, wherein the CVT case is disposed between the engine and the intake opening portion.

5. The utility vehicle of claim 1, wherein an air flow in the exterior side panel flows along a vehicle front-rear direction and/or along a vehicle height direction.

6. A utility vehicle having a CVT, comprising:
a vehicle body frame;

front and rear wheels supporting the vehicle body frame on the ground surface;
an engine providing power to the CVT;
a CVT case accommodating the CVT;
an exterior side panel supported to the vehicle body frame, the exterior side panel having an inner wall located inside a vehicle cabin and an outer wall located outside the vehicle cabin;
an intake chamber formed between the inner wall and the outer wall of the exterior side panel;
an intake opening portion provided in the exterior side panel for introducing ambient air present around the exterior side panel to the intake chamber;
an intake hose connecting the intake chamber with the CVT case; and
an outlet opening provided in the exterior side panel,
wherein the intake opening portion is offset from the outlet opening in a vehicle front-rear direction and/or a vehicle height direction.

* * * * *